Aug. 11, 1959     J. J. WALLACE     2,898,636
STICK REMOVER ATTACHMENT FOR COTTON EXTRACTORS AND
COMBINATION OF EXTRACTOR AND STICK REMOVER
Filed Dec. 31, 1956

INVENTOR
Jeffrey J. Wallace

BY Mason, Fenwick & Lawrence
ATTORNEYS

United States Patent Office 2,898,636
Patented Aug. 11, 1959

2,898,636

STICK REMOVER ATTACHMENT FOR COTTON EXTRACTORS AND COMBINATION OF EXTRACTOR AND STICK REMOVER

Jeffrey J. Wallace, Amite, La., assignor to Gullett Gin Company, Amite, La., a corporation of Louisiana Application December 31, 1956, Serial No. 631,845

6 Claims. (Cl. 19—37)

This invention relates to precleaning apparatus for seed cotton, and particularly to an attachment unit for a multi-stage hull extractor of the type disclosed in patent to J. E. Mitchell, No. 2,100,302, granted November 23, 1937, the attachment unit being designed to fit the said precleaning apparatus as a part thereof, and incorporating stick and green leaf removing instrumentalities, with means for selectively by-passing the cotton from the extractor to the attachment unit at a point between stages and returning it from the attachment unit to the extractor at a point between stages so that the precleaning may be completed in the extractor.

The principal object of the invention is to provide an extractor unit as described, which will convert the Mitchell type extractor into a machine having the stick and green leaf removing unit incorporated into its operation, said stick and leaf removing unit being designed either to be built into the extractor at first instance, or to be sold as an attachment for Mitchell type extractors now in the field, thereby giving the users of such extractors additional stick and green leaf removing equipment, without the necessity of purchasing a complete new machine. The Mitchell type extractor is extremely efficient as an extractor of hull debris and gritty matter, and is an adequate precleaner particularly for hand gathered cotton, but the problem of stick and green leaf removal is acute with mechanically harvested cotton, so that the combined machine is versatile in its application to either hand picked or mechanically harvested cotton.

Another object of the invention is the provision of a stick and green leaf removing attachment unit as described, having selectively operable correlated baffles which when the attachment is installed upon the Mitchell type extractor, in one position direct the cotton into the attachment unit and return it to the extractor, and in the alternative position cooperate to form with fixed partitioning elements an imperforate wall between the Mitchell type extractor and the attachment unit that excludes the cotton from entering the attachment unit.

Other objects of the invention will appear as the following description of a practical embodiment thereof proceeds.

In the drawing which accompanies and forms a part of the following specification:

Figure 1:
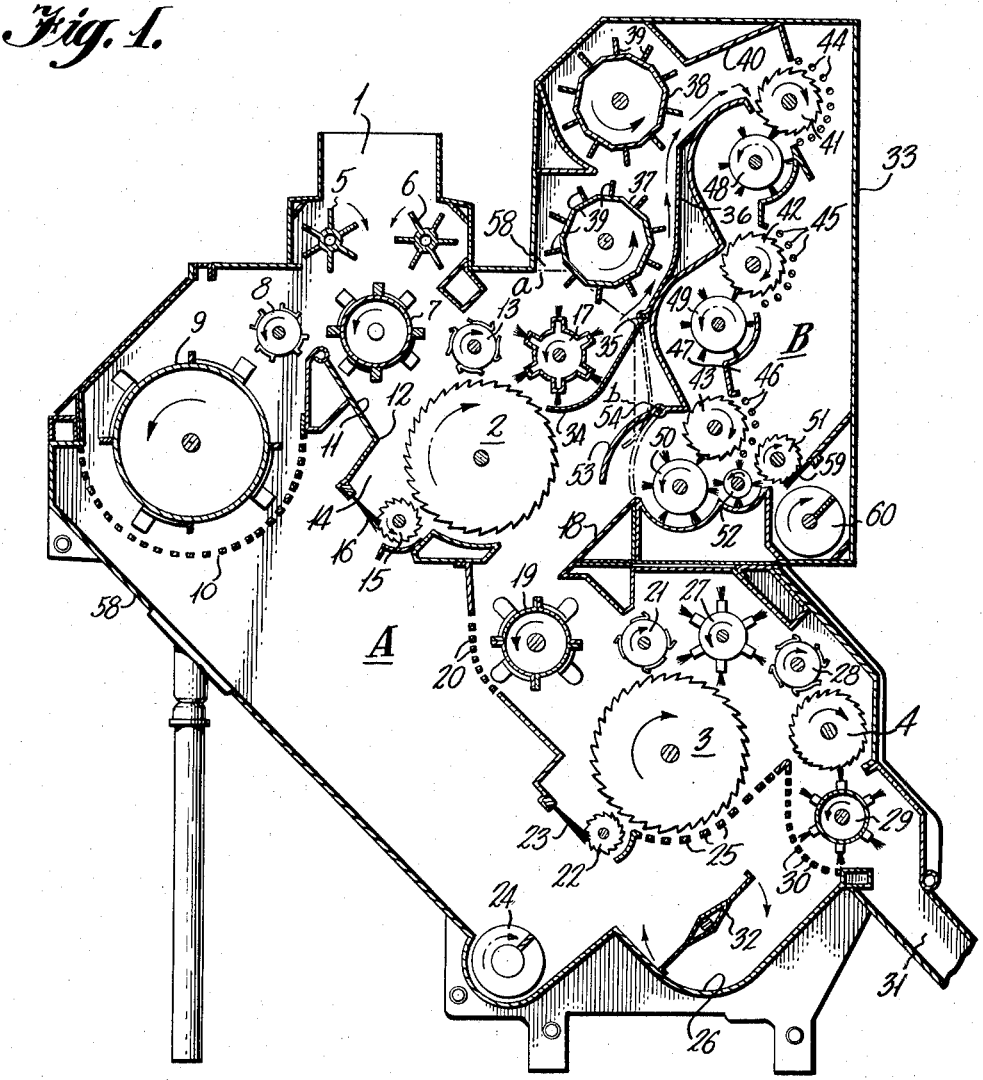
Figure 1 is a vertical side sectional view through an extractor of the Mitchell type, incorporating the stick and green leaf attachment unit.

Referring to the drawing, the Mitchell type extractor is designated as A, and the stick and green leaf attachment unit as B. The broken line a—b represents the edge of congruent side walls of the casing of the Mitchell type extractor in that portion of the casing from which a cover plate, not shown, has been removed to permit the mounting of the stick and green leaf removing attachment unit.

Adverting now to the detailed construction of the Mitchell type extractor as shown, this is adapted to be mounted on top of the gin and to receive cotton through the inlet 1, from a distributor, not shown. In this extractor there are three stages of extraction employing respectively the extracting saw cylinders 2, 3 and 4. There are the conventional cooperating feed rolls 5 and 6 beneath the inlet 1, between which the incoming seed cotton passes, being delivered to the directing cylinder 7 which passes the cotton to the upper periphery of the kicker roll 8, by which it is delivered to the cleaning cylinder 9, the function of which is to move the cotton against the underlying screen 10 for the removal of gritty matter and small trash which is not embedded in the cotton. The cleaning cylinder 9 lifts the cotton into the operative ridge of the lower periphery of the kicker cylinder, which transfers it to the directing cylinder 7. The latter cylinder throws the cotton against the mote board 11. There is some accumulation of the cotton at the lower end 12 of the mote board, the cotton being picked up by the extracting cylinder 2 and passed under the kicker roll 13, which rotates contra to the direction of rotation of the cylinder 2 at their points of adjacency and throws the boll fragments and other trash back toward the mote board 11, said trash gravitating into the chamber 14, at the bottom of which is a reclaimer cylinder 15, which catches whatever cotton is freed with the boll fragments, and returns it to the cylinder 2. The reclaimer cylinder rotates between the bristles of a brush 16 which combs the loose trash off of the cotton attached to the reclaimer cylinder. A doffer 17 removes the cotton from the extractor cylinder 2, which cotton descends along the inclined baffle 18 and is thrown by the cleaning cylinder 19 against the screen 20. This is the beginning of the second stage. Loosened trash and gritty matter pass through the screen 20, and the descending cotton is caught upon the extracting cylinder 3. Here the cotton passes under the kicker roll 21, which throws the motes and trash in a direction contra to that of the rotation of the cylinder 3, said motes and trash descending onto the reclaimer cylinder 22, which functions similar to the reclaimer cylinder 15 in returning such cotton as is freed by the kicker roll to the teeth of the cylinder 3, the reclaimer cylinder passing between the bristles of the brush 23, which combs the cotton on the reclaimer cylinder from the loosely adherent trash and motes. The trash from the screens 10 and 20 and that which passes the brushes 16 and 23 gravitates into the bottom of the casing of the extractor, which is provided with a trash conveyor 24.

The lower arc of the extracting cylinder 3 moves the cotton in contact with an underlying screen 25, through which motes and small trash pass and descend gravitationally into a sump 26 formed in the bottom of the extractor casing. A doffer 27 removes the cotton from the teeth of the extracting cylinder 3, throwing it onto the final extracting cylinder 4. This begins the third cleaning stage. The cotton on the cylinder 4 passes beneath the kicker roll 28, which throws back whatever motes or other trash it may encounter, which trash gravitates onto the screen 25. A doffer 29 removes the substantially clean cotton from the extracting cylinder 4 and causes it to traverse the underlying screen 30 before being discharged by the doffer into the chute 31, which supplies the gin on which the extractor is mounted. The debris which passes through the screens 25 and 30 into the sump 26 is carried over to the trash conveyor 24 by the rotary member 32.

In each of the cleaning stages of the Mitchell type extractor as herein illustrated, the principle of cleaning is substantially the same, that is, the employment of screens against which the cotton is centrifugally pressed, the distribution of cotton on saw cylinders and the bringing of the cotton by the saw cylinders into operative engagement with kicker rolls which impactively dislodge the trash particles engaged by the kicker rolls.

The concept of the present invention is to interpose the stick and green leaf removing unit between any two stages of the Mitchell type extractor, bypassing the cotton between stages through the unit, and returning it to the extractor head of at least one cleaning stage of the extractor so that the precleaning of the cotton is finished within the extractor. The invention would be complete if the Mitchell type extractor comprised only two cleaning stages. There are extractors of the stage type that operate upon a different principle from the one herein used for purpose of illustration, which are also eligible as the extractor element of the combination, provided that they fall short in themselves of being able to handle and remove a substantial portion of the sticks with green leaves, which are characteristic major contaminations of mechanically picked cotton.

Referring now to the stick and green leaf removing attachment unit per se, the cleaning instrumentalities operate upon a principle which is old, being disclosed in a bulletin published by the United States Department of Agriculture, entitled "Progress Statement of the Stick Remover Under Development at the Cotton Ginning Laboratory, Stoneville, Mississippi." The drawing of said bulletin is dated June 2, 1954. The principle is to have the cotton travel on saw cylinders at peripheral speeds which generate so strong a centrifugal force as to expel the sticks, which force is incidentally sufficient to throw cotton from the teeth of the saw cylinders, and to hold the cotton to the saw cylinders by means of a series of grid bars for each cylinder, the bars being spaced sufficiently close to one another to hold the cotton and the series being so closely adjacent the respective saw cylinders as to keep the cotton substantially tangent to the periphery of said cylinders, the grid bars being round in cross-section instead of being edged as in some lint cleaners, so as to avoid damaging the sample at such high peripheral speed of the saws.

Adverting to the drawing, it is seen that the stick and green leaf removing attachment unit comprises a casing 33, which has an opening congruent with the opening in the casing 58 of the extractor exposed by the removal of the cover plate of the latter casing, not shown, but the shape of which follows the broken line a—b. The casing 33 terminates in edges coinciding with the line a—b so that the two casings fit together and are secured to form in effect a single casing. A diverting baffle 34 is mounted on a shaft 35 journaled in opposite sides of the casing 33, which baffle may be extended to the position shown in Figure 1, in which it underlies the doffer 17, diverting the cotton from its normal progression to the second set of cleaning instrumentalities in the extractor and guiding it into the attachment unit, the cotton being impelled by the doffer 17 in an upward direction. A fixed partition 36 extends in an upward direction from the baffle 34, to the left of which, as viewed in the drawing, a pair of directional cylinders 37 and 38 are mounted one above the other. These rotate in the same direction as the doffer 17, and are furnished with transverse rows of radially extending spikes 39, which cooperate with the partition 36 in continuing to move the stream of cotton upward. The spikes 39 also perform the vitally important function of arranging the sticks which they encounter in transverse positions so that they can be ejected through the spaces between the grid bars which hold the cotton on the saw cylinders of the stick removing members. The gravitational counterdrag of the cotton against the partition 36 assists in the transverse arrangement of the sticks.

The upper part of the fixed partition 36 veers away from the upper directional cylinder 38 and cooperates with a fixed baffle 40 to form a conduit, the mouth of which opens adjacent the uppermost of three saw cylinders, respectively 41, 42 and 43, which represent parts of three cleaning stages within the attachment unit. These saw cylinders are arranged in generally vertical relation, and rotate at a speed considerably higher than is customary in an extractor. For example, in the attachment unit shown, the said saw cylinders are 7 inches in diameter and rotate at from 1000 to 1250 revolutions per minute, developing a centrifugal force of such strength as ordinarily to throw cotton from the saw cylinders. To prevent this, each saw cylinder on the leading side is associated with a series of grid bars designated respectively, by the reference characters 44, 45 and 46, so spaced with respect to one another, and arranged so close to the periphery of the respective saw cylinders, as to hold the cotton substantially tangent to the surface of the saw cylinders, keeping it attached to the saw teeth notwithstanding the centrifugal urge for it to become detached therefrom. The grid bars are round so as not to harm the sample.

At each successive cleaning stage a portion of the sticks, together with the green leaves as well as other foreign matter, are thrown off by centrifugal force and pass between the grid bars into the trash corridor 47. Each saw cylinder is associated with a doffer, the doffers being designated respectively, by the numerals 48, 49 and 50, operating beyond the series of grid bars, for removing cotton from the corresponding cylinders and delivering it to the cylinders of the next stage, or in the case of the final doffer 50, for returning the cotton to the extractor. The doffers are of the type having transverse rows of brushes which mix the cotton incident to its removal, thus exposing new surfaces on the peripheries of the saw cylinders to which the cotton is transferred, thus bringing other sticks to the surface of the cotton on the saw cylinders, facilitating its removal by centrifugal force. Due to the transverse disposition of the brush rows on the doffers, the parallel relation of the sticks to the grid bars established initially by the spikes on the directional cylinders 37 and 38, is not to an appreciable extent disturbed by the doffers. By subjecting the cotton to the stick removing operation in three successive stages, as shown, a very good job of stick removal is accomplished.

A reclaimer saw cylinder 51 is provided at the bottom of the trash corridor 47 to salvage any cotton that may have been thrown off with the sticks. The reclaimer cylinder 51 passes through the bristles of a brush 59, which comb the trash from the cotton, letting the trash fall into a sump containing the trash conveyor 60. The cotton is retrieved from the reclaimer cylinder by the doffer 52, which delivers it to the doffer 50, the primary function of which is to doff the cotton from the saw cylinder 43. Said doffer returns cotton from the last mentioned saw cylinder as well as cotton from the reclaimer cylinder to the extractor, the cotton being thrown by the doffer through the lower part of the common opening between the casings of the extractor and the stick removing attachment unit. The cotton lands upon the baffle 18, which delivers it gravitationally to the cylinder 19, which in turn passes the cotton to the saw cylinder 3, thus initiating the second cleaning stage of the extractor.

Figure 2:
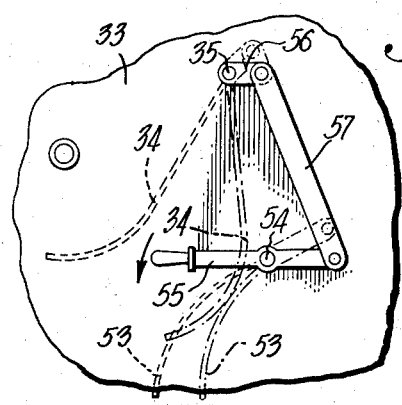
Figure 2 is a fragmentary elevation showing the baffle operating mechanism.

The cotton returned to the extractor by the doffer 50 is prevented from being thrown onto the adjacent saw cylinder 2 by the deflecting baffle 53, which is mounted on a shaft 54, the latter being journaled in the opposite sides of the casing 33 of the attachment unit. Said deflecting baffle is movable in correlation with the diverting baffle 34 by means shown in Figure 2. Said means, which is located on the outside of the casing 33, comprises a hand lever 55, fixed at an intermediate point in its length to the extended end of the shaft 54, and a crank arm 56 fixed to the shaft 35 of the diverting baffle 34. A link 57 connects the handle and crank arm. When the handle is in the position shown in full lines in Figure 2, both baffles are extended into the casing 58 of the extractor in bypassing relation to the cotton flow path through the extractor. When the handle is lowered in the direction of the arrow, shown in Figure 2, both baffles swing downwardly, moving out of the path of flow of cotton from the first to second cleaning stages in the extractor, and they cooperate to form a closure between the lower end of the partition 36 and the inclined baffle 18, excluding the entrance of cotton into the stack removing attachment unit.

The location of the stick removing attachment unit at the upper forward side of the conventional Mitchell type extractor and bypassing cotton between the first and second cleaning stages of the extractor appears to be optimum, since in the average gin house there is room for the installation of the attachment unit at this point, avoiding the necessity of the rearrangement of any apparatus or conduits appurtenant to the installed ginning system.

While I have in the above description disclosed a practical embodiment of the invention, it will be understood by those skilled in the art that the specific details of construction and arrangement of parts are by way of example and not to be construed as limiting the scope of the invention.

What I claim is:

1. In a precleaner for seed cotton, in combination, a multistage hull extractor and a multistage stick remover in by passing relation to said extractor, the latter having an upper cleaning stage comprising an extracting saw cylinder, means for detaching hull debris from the cotton carried by said cylinder, and a rotary brush doffer for removing cotton from said cylinder and normally discharging it downwardly to the anterior element of the next cleaning stage, said stick remover having a series of stick removing stages arranged in a generally vertical direction with the upper stage above the level of the upper stage of the extractor, the lowermost stick removing stage including a rotary brush doffer at a level which intersects the cotton path from the doffer of the upper extractor stage to the next lower extractor stage, casing structure enclosing said extractor and stick remover shaped to define an opening between said extractor and stick remover which extends from a level above the doffer of the upper extractor stage to a level below at least part of the doffer of the lowermost stick removing stage, a fixed partition in said stick remover having its lower end adjacent the doffer of the upper extractor stage and dividing said opening into upper and lower parts, said partition extending upwardly at the side of said series of stick removing stages adjacent said extractor, its upper end terminating adjacent the uppermost stick removing stage, a diverting baffle hinged at its upper end adjacent the lower end of said fixed partition swingable to a position underlying the doffer of the upper extractor stage for diverting the cotton stream discharged by said doffer in an upward direction along said fixed partition, said stick remover including means for elevating the cotton on said fixed partition and delivering it to the uppermost stick removing stage, a deflector baffle hinged at its upper end on an axis intersecting the lower part of said opening intermediately and swingable away from the doffer of the lowermost stick removing stage to deflect cotton from said last named doffer downwardly toward the lower extractor stage, connecting means coordinating the movement of said baffles whereby they swing together outwardly to their respective diverting and deflecting positions or inwardly into lapping relation, closing the part of said opening below said fixed partition.

2. A seed cotton stick remover as an attachment for a multistage extractor of the type having an upper stage comprising an extracting saw cylinder, means for removing hull debris from cotton carried by said saw cylinder and a rotary brush doffer for removing cotton from said cylinder and normally discharging it downwardly to the anterior element of the next lower extracting stage, said extractor having a casing including parallel side walls and a transverse peripheral connecting wall provided with an opening in its upper part extending from a level above said doffer to a level intersecting the cotton path from said doffer to the lower extractor stage, said doffer being closely adjacent the upper part of the plane of said opening, said stick remover having a casing with parallel side walls and a transverse peripheral connecting wall with an opening in its lower part adapted to fit the opening in the extractor casing congruently when the casing walls of the stick remover are joined to corresponding casing walls of the extractor, a fixed partition extending upwardly within said stick remover having its lower end adjacent the opening in said stick remover casing dividing it into upper and lower parts and having its upper end terminating short of the peripheral wall of said stick remover casing, said stick remover having a series of directional drums having transverse rows of radial spikes coacting with the side of said partition adjacent the upper part of said opening for lifting cotton received through said opening, to the upper end of said partition, a series of stick removing stages arranged in a generally vertical direction at the opposite side of said partition with the uppermost stage adjacent the upper end of said partition, each stage including a saw cylinder, a series of grid bars adjacent the leading sides of said cylinders arranged so close together and so close to the peripheries of the respective cylinders as to preclude the centrifugal detachment of cotton from said cylinders, and rotary brush doffers for said cylinders beyond said grid bars, the doffer of the lowermost stick removing stage being positioned to discharge the doffed cotton through the lower part of said opening, a baffle supported by said stick remover hingedly mounted at its upper end on an axis adjacent the lower end of said partition, adapted to swing outwardly of said stick remover casing in diverting relation to the normal downward cotton stream of the upper extractor stage, and a baffle also supported by said stick remover hingedly mounted at its upper end on an axis transversely intersecting the lower part of said opening intermediately, swingable outwardly to a position in which it deflects cotton thrown through said opening by the doffer of the lowermost stick removing stage, downward in the extractor toward the lower extractor stage, connecting means coordinating the movement of said baffles whereby they swing together outwardly to their respective diverting and deflecting positions or inwardly into lapping relation closing the part of said opening below said fixed partition.

3. In a precleaner for seed cotton, in combination, a hull extractor of the type which normally passes the cotton through successive cleaning stages, and a stick remover operatively connected thereto, being in communication by way of a return passage for cotton after treatment in said stick remover, said passage opening into said extractor at a point anterior to the final cleaning stage in said extractor, said stick remover including an upwardly extending partition, means at the foot of said partition operable at will to direct cotton from said extractor at a point in its flow path between successive cleaning stages and directing it onto said partition at one side of the latter, spiked cylinders for moving said cotton progressively up said partition and over the top thereof, the spikes of said cylinders being so related to the cotton on said partition as to engage sticks in said cotton and turn them transversely of said cotton stream, a series of saw cylinders at the opposite side of said partition, means for transferring cotton downward from one saw cylinder to the next, and series of parallel grid bars adjacent the peripheries of said saw cylinders so spaced as to pass sticks lying substantially axially parallel to said bars, said saw cylinders being driven at such speed as to expel sticks centrifugally through the spaces between the bars.

4. A stick remover attachment for a hull extractor of the type which normally passes cotton through successive cleaning stages, said stick remover having a casing adapted to be operatively coupled to the casing of the extractor, containing stick removing instrumentalities and provided with coordinated baffles adapted to be extended at will into the extractor to which the stick remover may be coupled, into the cotton stream between successive cleaning stages, one to divert cotton from said extractor into said stick remover, and the other to conduct the cotton after stick removing treatment in said stick remover, back into the path of the cotton stream in said extractor, said stick remover including an upwardly extending partition, said one baffle means being located at the foot of said partition to divert cotton from said extractor at a point in its flow path between successive cleaning stages and directing it onto said partition at one side of the latter, spiked cylinders for lifting cotton so diverted progressively up said partition and over the top thereof, the spikes of said cylinders being so related to the cotton on said partition as to engage sticks in said cotton and turn them transverse to the direction of flow of said cotton, a series of saw cylinders at the opposite side of said partition, means for transferring cotton downward from one cylinder to the next, and series of parallel grid bars adjacent the peripheries of said saw cylinders so spaced as to pass sticks lying substantially axially parallel to said bars, said saw cylinders being driven at such speed as to expel sticks through the spaces between said bars.

5. In a precleaner for seed cotton, in combination, a multistage hull extractor and a stick remover in alternative bypassing relation thereto, said hull extractor having an upper stage comprising an extracting saw cylinder, means for effecting partial removal of hull debris from cotton carried by said cylinder, and a doffer for removing cotton with the remaining hull debris from said cylinder and normally passing it to a lower extracting stage, said extracting cylinder extending below said doffer, casing structure enclosing said extractor and stick remover, shaped to define an opening between said extractor and stick remover, said opening extending from above to below said doffer, a fixed upwardly extending partition in said stick remover having its lower end terminating adjacent said doffer and its upper end terminating short of said casing structure, said lower end dividing said opening intermediately into upper and lower parts, said stick remover including rotatable directional means at the side of said partition toward said extractor cooperating with said partition to move cotton up and over said partition, serially related stick removing stages positioned in generally vertical arrangement at the upper side of said partition beginning adjacent the upper end thereof, each stage comprising a saw cylinder, said saw cylinders being driven at peripheral speed sufficiently high to eject sticks from the cotton carried thereby centrifugally, with the incidental hazard of detaching cotton from the saw cylinder, a series of grid bars for each saw cylinder providing spaces therebetween through which the sticks are ejected, said bars being so closely spaced and so closely contiguous to the periphery of the respective saw cylinders as to hold the cotton attached to the saw cylinders, and doffers beyond said grid bars for removing cotton from the saw cylinders, the doffer of the upper extractor stage and the doffer of the lowest stick removing stage being adjacent respectively the upper and lower parts of said opening, and means for selectively bringing said stick remover into bypassing relation to said extractor or excluding it from such relationship, comprising a pair of correlated hinged baffles, in one position closing the lower part of said opening, and being alternatively movable to a position unobstructing the lower part of said opening, one of said baffles underlying the doffer of the upper extractor stage to divert the cotton discharged therefrom upwardly to said directional means, the other assuming a position in which it deflects cotton thrown through the lower part of said opening by the doffer of the lowest stage of the stick remover, downwardly toward the lower extractor stage and away from the saw cylinder of the upper extractor stage, said rotatable directional means comprising cylinders having transverse rows of spikes, the latter operating sufficiently close to said fixed partition to enter the cotton stream on said partition to elevate said cotton and arrange the sticks therein substantially transversely of the cotton stream.

6. In a precleaner for seed cotton, as claimed in claim 5, the grid bars associated with the saw cylinders of the stick remover stages being round in cross-section.

References Cited in the file of this patent

UNITED STATES PATENTS

| | | |
|---|---|---|
| 1,987,241 | MacKenzie | Jan. 8, 1935 |
| 2,580,451 | Merkel et al. | Jan. 1, 1952 |
| 2,739,353 | Mitchell et al. | Mar. 27, 1956 |